Figure 1:
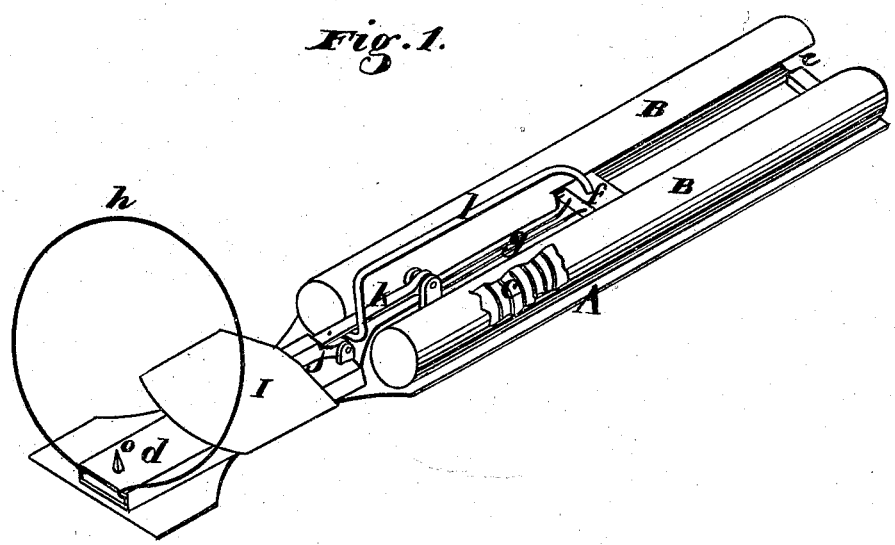

A. J. LARSON.
ANIMAL-TRAP.

No. 173,798. Patented Feb. 22, 1876.

Witnesses
Geo. H. Strong.
Jno. L. Boone.

Inventor
Albert J. Larson
by Dewey & Co.
Attys.

UNITED STATES PATENT OFFICE.

ALBERT J. LARSON, OF SAN FRANCISCO, CALIFORNIA.

IMPROVEMENT IN ANIMAL-TRAPS.

Specification forming part of Letters Patent No. 173,798, dated February 22, 1876; application filed October 4, 1875.

*To all whom it may concern:*

Be it known that I, ALBERT J. LARSON, of San Francisco city and county, State of California, have invented an Improved Gopher-Trap; and I do hereby declare the following description and accompanying drawings are sufficient to enable any person skilled in the art or science to which it most nearly appertains to make and use my said invention or improvement without further invention or experiment.

My invention relates to an improved animal-trap, which is especially useful for catching gophers.

Referring to the accompanying drawing—

A is a plate having two parallel barrels, B B, secured upon it at a short distance apart, and in each of these barrels I place a strong spring, c.

The plate A projects to some distance from one end of the barrels, and this projecting end has a tube, d, formed on top of it on line with the space between the barrels B B.

The barrels B B are both provided with longitudinal slots e on their inside, and a cross-head, f, extends across the intervening space, while its opposite ends enter the slots in the tubes so as to bear against the rear ends of the springs.

A copper or other flexible wire or cord, g, has its two ends secured to the cross-head g, while its bight passes through the tube d and forms a loop, h, at the outer extremity of the tube. I is a trip-plate, which is hinged to the tube d near the ends of the barrels.

A notch, j, is made in the shank of this plate, with which a hinged pawl, k, is arranged to engage.

A hook-bar, l, has one end attached to the sliding cross-head f, so that by drawing the cross-head forward until the hook of the hook-bar catches under the pawl k the springs will be compressed and the bight end of the wire or cord g will be projected beyond the end of the tube d, so as to form a loop which is large enough to admit the body of the animal.

I prefer to use copper wire to form the loop, as it is very flexible and will retain whatever position it may be placed in.

When the trap is set, I make an opening in the gopher-hole, and then adjust the distended loop so that it will stand vertically. I then insert the tube end of the trap inside of the gopher-hole, so that the loop will surround the opening through which the gopher must pass.

When the gopher attempts to pass out of the hole, his body must pass through the loop h, but the trigger-plate I is so near the loop that when he steps upon it his body will be only half way through the loop.

The weight of his body will then free the pawl k and release the hook-bar, so that the spring will force the cross-head f backward, and draw the loop closely around the body of the animal and hold him.

An upward projecting point, o, on the end of the tube will enter the body of the animal as the contracted loop draws him down, and thus he is both tied down and impaled so that he cannot escape.

A single barrel and spring could be used, in which case the barrel would have to be slotted on both sides and the arms of the cross-head would project through the slots.

This trap can be made quite cheaply, and it provides a positive means of entrapping the wary gopher, as the presence of the loop cannot be detected when it is properly adjusted, and all of the operative parts are at a distance from the opening.

Having thus described my invention, what I claim, and desire to secure by Letters Patent, is—

A gopher-trap, consisting of the plate A, having one or more barrels, B, with their springs c, tube d, trip-plate I, and pawl k, in combination with the cross-head f, with its hook-bar l, and copper or other flexible wire or cord g, arranged to pass through the tube d, and form a loop, h, in advance of the trip-plate, all combined and arranged to operate substantially as above described.

ALBERT J. LARSON.

Witnesses:
GEO. H. STRONG,
JNO. L. BOONE.